United States Patent [19]

Ota

[11] Patent Number: 4,957,087
[45] Date of Patent: Sep. 18, 1990

[54] APPARATUS FOR CONTROLLING ENGINE OPERABLE ON GASOLINE/ALCOHOL FUEL BLEND

[75] Inventor: Tadaki Ota, Fujisawa, Japan
[73] Assignee: Nissan Motor Company, Ltd., Japan
[21] Appl. No.: 421,566
[22] Filed: Oct. 11, 1989
[30] Foreign Application Priority Data Oct. 11, 1988 [JP] Japan .................. 63-253714

[51] Int. Cl.$^5$ .................. F02D 41/04; F02D 41/22
[52] U.S. Cl. .................. 123/479; 123/1 A; 123/494; 123/486
[58] Field of Search .............. 123/1 A, 416, 417, 478, 123/479, 480, 494, 486; 364/431.05

[56] References Cited

U.S. PATENT DOCUMENTS

| | | | |
|---|---|---|---|
| 4,391,253 | 7/1983 | Ito | 123/478 |
| 4,438,749 | 3/1984 | Schwippert | 123/494 |
| 4,481,908 | 11/1984 | Iida | 123/1 A |
| 4,495,930 | 1/1985 | Nakajima | 123/478 X |
| 4,546,732 | 10/1985 | Mae et al. | 123/478 X |
| 4,630,584 | 12/1986 | Higashiyama et al. | 123/425 |
| 4,703,732 | 11/1987 | Wineland et al. | 123/1 A X |
| 4,706,629 | 11/1987 | Wineland et al. | 123/478 |
| 4,706,630 | 11/1987 | Wineland et al. | 123/478 |
| 4,905,655 | 3/1990 | Maekawa | 123/494 |

FOREIGN PATENT DOCUMENTS 0098540  8/1981  Japan .

Primary Examiner—Willis R. Wolfe
Attorney, Agent, or Firm—Lowe, Price, LeBlanc, Becker & Shur

[57] ABSTRACT

An apparatus for use in an internal combustion engine operable on either of gasoline fuel and gasoline-alcohol fuel blend. The apparatus includes an alcohol concentration sensor for sensing the alcohol concentration of the fuel to be delivered to the engine, and an oxygen sensor sensitive to the oxygen content in exhaust gases discharged from the engine for producing an air/fuel ratio feedback signal. A difference of the air/fuel ratio from the stoichiometric value is calculated based on the air/fuel ratio feedback signal for a closed loop air/fuel ratio control. A correction factor is used to correct the amount of fuel delivered to the engine so as to provide fuel enrichment during high engine load conditions. In the event of failure of the alcohol concentration sensor, the amount of fuel delivered to the engine is determined with the alcohol concentration being set at a predetermined value. When the engine is operating with an effective closed loop air/fuel ratio control after the alcohol concentration is set at the predetermined value, both of the correction factor and the ignition timing are determined based on the calculated air/fuel ratio difference. If the closed loop air/fuel ratio control is clamped after the alcohol concentration is set at the predetermined value, the ignition timing is determined on an assumption that gasoline fuel is delivered to the engine, whereas the correction factor is set to inhibit the fuel enrichment.

6 Claims, 5 Drawing Sheets

FIG.4

MO TABLE      ADV [deg BTDC]

| PB mmHg / N rpm | 550 | 440 | 360 | 300 | 220 | 100 | 40 | 0 |
|---|---|---|---|---|---|---|---|---|
| 800  | 14 | 14 | 18 | 22 | 20 | 10 | 8  | 7  |
| 1200 | 15 | 15 | 19 | 23 | 21 | 11 | 9  | 8  |
| 1600 | 22 | 22 | 24 | 26 | 25 | 21 | 16 | 12 |
| 2400 | 32 | 33 | 33 | 31 | 29 | 25 | 20 | 22 |
| 3200 | 37 | 37 | 39 | 38 | 35 | 30 | 24 | 27 |
| 4000 | 40 | 40 | 39 | 39 | 39 | 36 | 29 | 29 |
| 4800 | 40 | 40 | 40 | 40 | 40 | 40 | 32 | 30 |
| 5600 | 40 | 40 | 40 | 40 | 40 | 40 | 32 | 30 |

FIG.5

M30 TABLE      ADV [deg BTDC]

| PB mmHg / N rpm | 550 | 440 | 360 | 300 | 220 | 100 | 40 | 0 |
|---|---|---|---|---|---|---|---|---|
| 800  | 19 | 19 | 18 | 17 | 17 | 13 | 13 | 13 |
| 1200 | 20 | 20 | 19 | 18 | 18 | 14 | 14 | 14 |
| 1600 | 24 | 24 | 23 | 21 | 19 | 19 | 18 | 19 |
| 2400 | 34 | 34 | 31 | 27 | 25 | 23 | 23 | 20 |
| 3200 | 30 | 30 | 29 | 27 | 26 | 23 | 23 | 21 |
| 4000 | 29 | 29 | 27 | 25 | 24 | 23 | 23 | 21 |
| 4800 | 29 | 29 | 27 | 25 | 24 | 23 | 23 | 22 |
| 5600 | 29 | 29 | 27 | 25 | 24 | 23 | 23 | 23 |

FIG. 6

| N rpm \ PB mmHg | 550 | 440 | 360 | 300 | 220 | 100 | 40 | 0 |
|---|---|---|---|---|---|---|---|---|
| | | | M60 TABLE | | | | ADV[deg BTDC] | |
| 800 | 18 | 18 | 17 | 16 | 14 | 13 | 13 | 13 |
| 1200 | 19 | 19 | 18 | 17 | 15 | 14 | 14 | 14 |
| 1600 | 22 | 22 | 21 | 20 | 18 | 18 | 16 | 17 |
| 2400 | 27 | 27 | 28 | 23 | 20 | 20 | 19 | 19 |
| 3200 | 27 | 27 | 26 | 23 | 23 | 22 | 22 | 20 |
| 4000 | 27 | 27 | 26 | 24 | 23 | 22 | 22 | 20 |
| 4800 | 27 | 27 | 26 | 24 | 23 | 22 | 22 | 21 |
| 5600 | 28 | 28 | 27 | 25 | 23 | 22 | 22 | 21 |

FIG. 7

| N rpm \ PB mmHg | 550 | 440 | 360 | 300 | 220 | 100 | 40 | 0 |
|---|---|---|---|---|---|---|---|---|
| | | | M85 TABLE | | | | ADV [deg BTDC] | |
| 800 | 17 | 17 | 15 | 14 | 13 | 13 | 13 | |
| 1200 | 18 | 18 | 16 | 14 | 14 | 14 | 14 | 13 |
| 1600 | 20 | 20 | 19 | 17 | 16 | 15 | 15 | 16 |
| 2400 | 26 | 26 | 25 | 24 | 22 | 20 | 19 | 19 |
| 3200 | 25 | 25 | 24 | 22 | 21 | 21 | 19 | 19 |
| 4000 | 25 | 25 | 24 | 22 | 21 | 21 | 20 | 20 |
| 4800 | 25 | 25 | 24 | 22 | 21 | 21 | 20 | 20 |
| 5600 | 25 | 25 | 24 | 22 | 21 | 21 | 21 | 21 |

4,957,087

APPARATUS FOR CONTROLLING ENGINE OPERABLE ON GASOLINE/ALCOHOL FUEL BLEND

BACKGROUND OF THE INVENTION

This invention relates to an apparatus for controlling an internal combustion engine operable on gasoline fuel or gasoline/alcohol fuel blend.

For example, Japanese Patent Kokai No. 56-98540 discloses an apparatus for controlling an internal combustion engine operable on gasoline fuel or gasoline/alcohol fuel blend. The engine control apparatus employs an oxygen sensor sensitive to the oxygen content in exhaust gases discharged from the engine for providing a closed loop air/fuel ratio control and an alcohol concentration sensor sensitive to the alcohol concentration of the fuel delivered to the engine. The sensed alcohol concentration is used in calculating appropriate values for fuel delivery requirement in the form of fuel-injection pulse-width and ignition-system spark timing.

However, such a conventional engine control apparatus will fail to calculate appropriate values for fuel delivery requirement and ignition-system spark timing., resulting in unstable engine operation in the event of failure of the alcohol concentration sensor.

SUMMARY OF THE INVENTION

Therefore, it is a main object of the invention to provide an engine control apparatus which can continue smooth and stable engine operation in the event of failure of an alcohol concentration sensor used to sense the alcohol concentration of the fuel delivered to the engine.

There is provided, in accordance with the invention, an apparatus for use with an internal combustion engine operable on either of gasoline fuel and gasoline/alcohol fuel blend. The apparatus comprises an alcohol concentration sensor sensitive to an alcohol concentration of the fuel to be delivered to the engine for producing an alcohol concentration signal indicative of a sensed alcohol concentration, and an oxygen sensor sensitive to an oxygen content of exhaust gases discharged from the engine for producing an air/fuel ratio feedback signal. The apparatus also comprises a control unit coupled to the alcohol concentration sensor and the oxygen sensor for controlling the amount of fuel metered to the engine and the timing of ignition at the engine. The control unit includes means responsive to the air/fuel ratio feedback signal for calculating a differenceof the air/fuel ratio from a stoichiometric value, first means for calculating a first value for the amount of fuel metered to the engine based on engine operating conditions, second means for calculating a second value for the ignition timing based on engine operating conditions for the sensed alcohol concentration, third means for correcting the calculated first value for the sensed alcohol concentration fourth means for correcting the calculated first value to provide fuel enrichment during high engine load conditions, fifth means for correcting the calculated first value based on the calculated air/fuel ratio difference to provide a closed loop air/fuel ratio control, sixth means responsive to failure in the alcohol concentration sensor for producing a failure signal, and seventh means responsive to the failure signal for forcing the third means to correct the calculated first value for a predetermined alcohol concentration. The seventh means inhibits the fourth means from providing fuel enrichment while forcing the second means to calculate the second value for the gasoline fuel when the closed loop air/fuel ratio control is clamped after the third means is forced to correct the calculated first value for the predetermined alcohol concentration. The seventh means forces the fourth means to correct the calculated first value based on the calculated air/fuel ratio difference and the second means to calculate the second value based on the calculated air/fuel ratio difference when the closed loop air/fuel ratio control is in order after the third means is forced to correct the calculated first value for the predetermined alcohol concentration.

BRIEF DESCRIPTION OF THE DRAWINGS

The invention will be described in greater detail by reference to the following description taken in correction with the accompanying drawings, in which:

FIGS. 4 through 7 are diagrams showing tables used in calculating appropriate spark advance value for different alcohol concentrations.

DETAILED DESCRIPTION OF THE INVENTION

Figure 1:
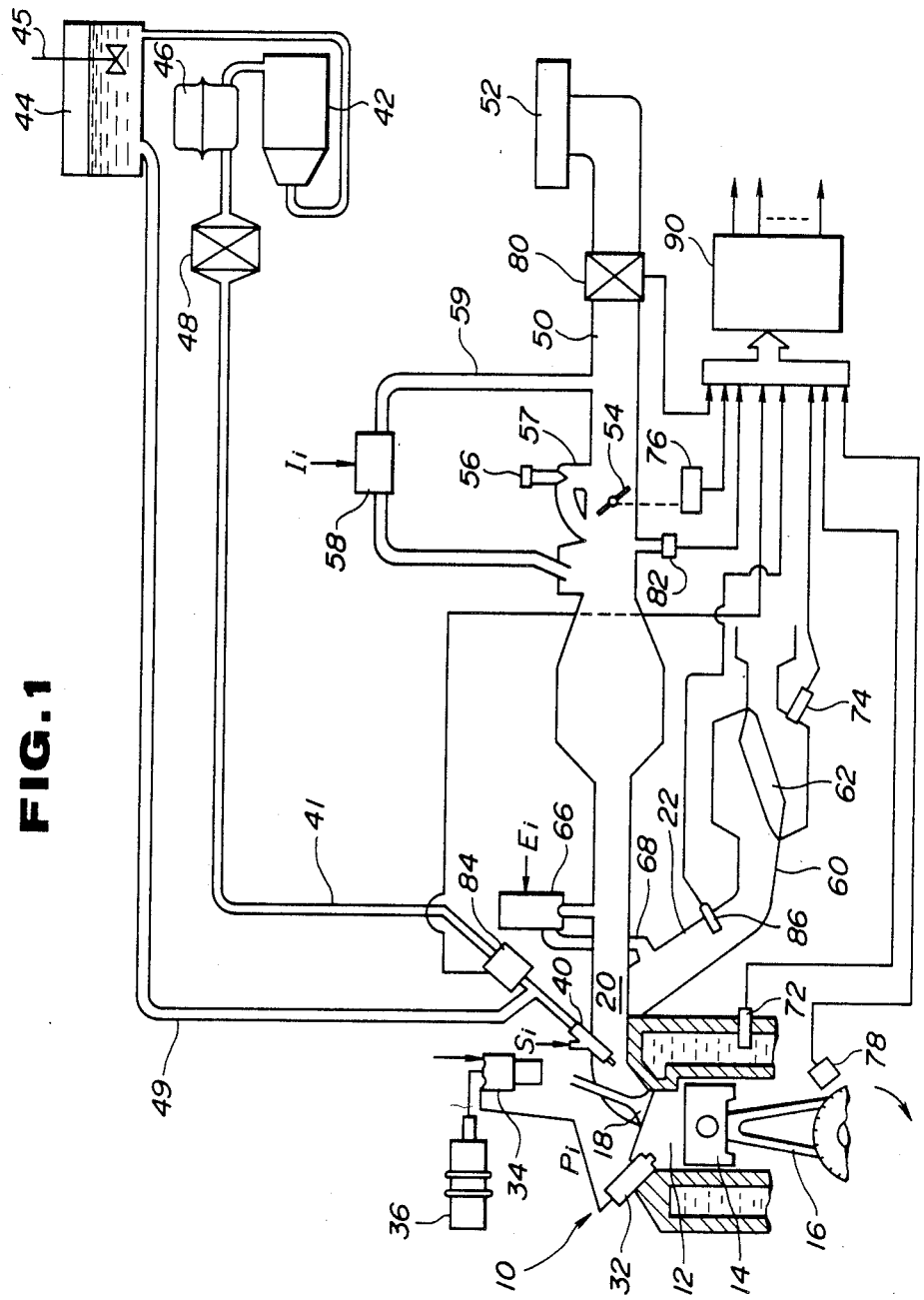
FIG. 1 is a schematic block diagram of an internal combustion engine to which the invention is applicable.

With reference to the drawings, and in particular to FIG. 1, there is shown a schematic diagram of an engine control apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10 in response to reciprocation of the piston 14 within the cylinder 12.

An intake manifold 20 is connected with the cylinder 12 through an intake port with which an intake valve 18 is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from a distributor 34 connected to an ignition coil 36. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The intake and exhaust valves are driven through a suitable linkage with the crankshaft.

A fuel injector 40 is connected by a conduit 41 to a fuel pump 42 which is also connected to a fuel tank 44. The fuel pump 42 is electrically operated to maintain sufficient pressure. The fuel tank 44 contains a gsoline fuel or a gasoline-alcohol fuel blend. The alcohol fuel may include methanol, ethanol, or methanol/ethanol blend. A device 45 is provided for stirring the gasoline/alcohol fuel blend to achieve a constant alcohol concentration in the fuel tank 44. A fuel pressure regulator 46 is connected to the fuel pump 42 and through a fuel filter 48 to the fuel injector 40. The pressure regulator 46 maintains the pressure differential across the fuel injector 40 at a constant level. This regulation is accomplished by a variation in the amount of excess fuel returned through the return conduit 49 to the fuel tank 44. The fuel injector 40 opens to inject fuel into the intake manifold 12 when it is energized by the presence of electrical current Si. The length of the electrical pulse, that is, the pulse-width, applied to the fuel injector 40 determines the length of time the fuel injector opens and , thus, determines the amount of fuel injected into the intake manifold 20.

Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal (not shown). The degree to which the accelerator pedal is depressed controls the degree of rotation of the throttle valve 54. The accelerator pedal is manually controlled by the operator of the engine control system. An idle adjustment screw 56 is provided to control the amount of air introduced into the induction passage 50 through a passage 57 bypassing the throttle valve 54 when the engine is idling. Similarly, a control valve 58 is provided to control the amount of air introduced into the induction passage 50 through a passage 59 bypassing the throttle valve 54. Preferably, the control valve 58 responds to a control pulse signal by opening the bypass passage 59 according to the duty ratio of the control pulse signal.

In the operation of the engine 10, fuel is injected through the fuel injector 40 into the intake manifold 20 and mixes with the air therein The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 32 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. Most of the exhaust gases are discharged to the atmosphere through an exhaust system which conventionally includes an exhaust passage 60, a catalytic converter 62, a muffler and an exhaust pipe. Some of the exhaust gases, however, are recirculated to the combustion chamber 12 through an exhaust gas recirculation (EGR) system. The EGR system includes a valve 66 provided in an EGR passage 68. The valve 66 is controlled to determine the amount of exhaust gases recirculated through the EGR passage 68 to the combustion chamber 12.

Although the engine 10 as illustrated in FIG. 1 shows only one combustion chamber 12 formed by a cylinder and piston, it should be understood that the engine control system described herein is designated for use on a multi-cylinder engine. Thus, it should be understood that the number of the intake valves, exhaust valves, reciprocating pistons, spark plugs, and fuel injectors are the same as the number of the cylinders. Only one EGR valve 66, one throttle valve 54 and one ignition coil 36 are required for multi-cylinder applications.

The amount of fuel metered to the engine, this being determined by the width of the electrical pulses Si applied to the fuel injector 40, the fuel-injector timing, the EGR valve position, and the ignition-system spark timing are repetitively determined from calculations performed by a digital computer, these calculations being based upon various conditions of the engine that are sensed during its operation. These sensed conditions includes cylinder-head coolant temperature TW, catalytic converter temperature TC, exhaust oxygen content VS, throttle position CV, engine speed N, intake air flow QA, engine intake-manifold absolute-pressure PB, and alcohol concentration AC. Thus, a cylinder-head coolant temperature sensor 72, a catalytic converter temperature sensor 74, a throttle position sensor 76, a crankshaft position sensor 78, a flow meter 80, an intake-manifold absolute-pressure sensor 82, an alcohol concentration sensor 84, and an oxygen sensor 86 are connected to a control unit 90.

The cylinder-head coolant temperature sensor 72 preferably is mounted in the engine cooling system and comprises a thermistor connected in an electrical circuit capable of producing a coolant temperature signal in the form of a DC voltage having a variable level proportional to coolant temperature TW. The catalytic converter temperature sensor 74 senses a catalytic converter temperature and produces a catalytic converter temperature signal in the form of a DC voltage proportional to a sensed catalytic converter temperature TC. The throttle position sensor 76 is a potentiometer electrically connected in a voltage divider circuit for producing a throttle position signal in the form of a DC voltage proportional to throttle valve position CV. The crankshaft position sensor 78 produces a series of crankshafts position electrical pulses C1, each corresponding to two degrees of rotation of the engine crankshaft, of a repetition rate directly proportional to engine speed and a series of reference electrical pulses CA at a predetermined number of degrees before the top dead center position of each engine piston. The flow meter 80 is responsive to the air flow QA through the induction passage 50 to produce an intake airflow signal proportional thereto. The intake-manifold absolute-pressure sensor 82 preferably is a strain-gauge diaphragm-type absolute pressure transducer located in a position in the intake manifold wherein there is minimum exposure to transient pressure conditions. The intake-manifold absolute-pressure sensor 82 produces an intake-manifold absolute-pressure signal indicative of a sensed intake-manifold absolute-pressure PB.

The alcohol concentration sensor 84 is located at a position suitable to sense an alcohol concentration AC contained in the fuel delivered to the fuel injector 40 and it produces an alcohol concentration signal indicative of a sensed alcohol concentration AC. The alcohol concentration sensor 84 may comprise a capacitive probe inserted in the conduit 41 connected to the fuel injector 40. The capacitive prove has a capacitance variable in dependence on the alcohol concentration AC of the fuel delivered to the fuel injector 40. The capacitive probe is connected to a circuit for producing a signal proportional to the probe capacitance.

The oxygen sensor 86 monitors the oxygen content of the exahaust and it is effective to provide an air/fuel ratio feedback signal VS that shifts abruptly between a high value representing a rich mixture relative to the stoichiometric value and a low value representing a lean mixture relative to the stoichiometric value. Consequently, the air/fuel ratio feedback signal is useful to indicate only the sense of deviation of the air/fuel ratio relative to the stoichiometric value. The output of the oxygen sensor 86 is provided to a comparator switch whose couput is high or low value representing the sense of deviation of the air/fuel ratio of the mixture supplied to the engine from the stoichiometric value. The output of the comparator switch is coupled to a circuit which provides an air/fuel ratio control signal which varies at a constant rate in one direction when the air/fuel ratio is leaner than the stoichiometric value and changes at a constant rate in the opposite direction when the air/fuel ratio is greater than the stoichiometric value. The control signal will oscillate about the stoichiometric air/fuel ratio as sensed by the oxygen sensor thereby producing an average stoichiometric air/fuel ratio of the mixure supplied to the engine.

The control unit 90 comprises a digital computer which includes a central processing unit (CPU) 61, a random access memory (RAM), a read only memory (ROM), and an input/output control circuit (I/O). The central processing unit communicates with the rest of the computer via data bus. The input/output control circuit includes an analog-to-digital converter which receives analog signals from the flow meter and other sensors and converts them into digital form for application to the central processing unit which selects the input channel to be converted. The read only memory contains programs for operating the central processing unit and further contains appropriate data in look-up tablets used in calculating appropriate values for fuel delivery requirements and ignition-system spark timing. The central processing unit may be programmed in a known manner to interpolate between the data at different entry points.

The central processing unit calculates the fuel delivery requirement in the form of fuel-injection pulse-width from an arithmetic relationship programmed into the computer. This arithmetic relationship defines fuel-injection pulse-width Ti as a function of intake air flow QA, engine speed N, and cylinder-head coolant temperature TW and it is represented as:

$$= K \times (QA/N) \times (CTW + \ldots + KMR) \times ALPHA \times KAC$$

where K is a constant, CTW is an engine coolant temperature related correction factor, KMR is a fuel enrichment related correction factor for providing fuel enrichment during high engine load conditions, for example, in an engine intake-manifold absolute-pressure range of 0 mmHg to 50 mmHg, ALPHA is a correction factor for providing a closed loop air/fuel ratio control, an KAC is a correction factor related to the alcohol concentration AC contained in the fuel delivered to the fuel injector 40. The calculated pulse-width Ti may further compensated for battery voltage variations and changes in the engine components with time.

The central processing unit calculates the requireed ignition-system spark-timing in the form of advance angle ADV with respect to piston top dead center (TDC) from selected one of arithmetic relationships programmed into the computer. Each of these arithmetic relationships specifies this controlled variable as a function of engine speed N and intake-manifold absolute-pressure PB for a specified alcohol concentration contained in the fuel delivered to the fuel injector 40.

Control words specifying desired fuel delivery requirements and ignition-system spark timing are periodically transferred by the central processing unit to the fuel-injection and spark-timing control circuits included in the input/output control circuit. The fuel injection control circuit converts the received control word into a fuel injection pulse signal for application to a power transistor which connects the fuel injector 40 to the engine battery for a time period determined by the width of the fuel injection control pulse signal. The spark timing control circuit converts the received control word into a spark timing control pulse signal for application to a power transistor which connects the ignition coil to the engine battery for a time period determined by the width of the spark timing control pulse signal.

The central processing unit samples the closed loop air/fuel ratio control signal once for each of sampling events for calculating an average value representing the existing air/fuel ratio. The central processing unit calculates a difference ΔALPHA of the calculated average value relative to the stoichiometric value and stores the calculated error in the computer memory. During normal engine operating conditions, the central processing unit has a learning control function of relating the calculated difference ΔALPHA to existing engine operating conditions, for example, engine load and engine speed. A new difference ΔALPHA is stored in the computer memory addressable by the existing engine operating conditions. The central processing unit utilizes the stored difference ΔALPHA to calculate the correction factor ALPHA which is used to further adjust the calculated injection interval in a direction to correct the sensed air/fuel ratio error.

Figure 2:
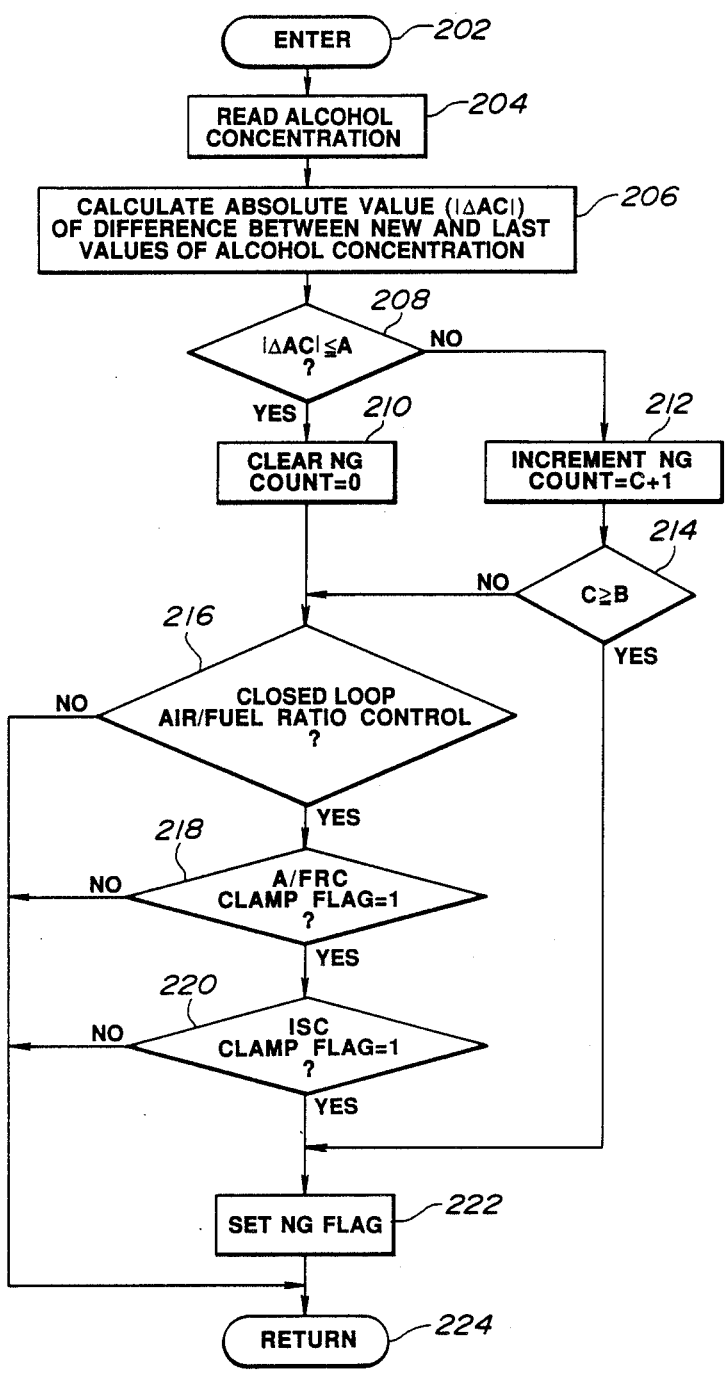
FIG. 2 is a flow diagram illustrating the programming of the digital computer as it is used to detect failure in the alcohol concentration sensor.

FIG. 2 is a flow diagram illustrating the programming of the digital computer as it is used to check failure in the alcohol concentration sensor 84. The computer program is entered at the point 202. At the point 204 in the program, the alcohol concentration signal fed from the alcohol concentration sensor 84 is converted into digital form and read into the random access memory. At the point 206 in the program, the central processing unit calculates an absolute value of the difference between new and last values of the alcohol concentration signal. At the point 208 in the program, a determination is made as to whether or not the calculated value |ΔAC| is equal to or less than a predetermined value A. If the answer to this question is "yes", then it means that the change of the alcohol concentration signal is in a predetermined range and the program proceeds to the point 210 where the NG counter is cleared to zero. Following this, the program proceeds to the point 216.

If the determination at the point 208 is "no", then the program proceeds to the point 212 where the count of the NG counter is incremented. After the count of the NG counter has been incremented at the point 212, the program proceeds to a determination step at the point 214. This determination is as to whether or not the count C of the NG counter is equal to or greater than a predetermined value B which may be set at a suitable value corresponding to a 200 mv change at uniform intervals of 100 mm. sec. If the answer to this question is "yes", then it means that the alcohol concentration signal changed to a great extent impossible when the alcohol concentration sensor 84 is operating in order and the program proceeds to the point 222 where an NG flag is set to indicate that the alcohol concentration sensor 84 or its associated components is subject to failure. Otherwise, the program proceeds to the point 216.

At the point 216 in the program, a determination is made as to whether or not the engine is operating with a closed loop air/fuel ratio control. If the answer to this question is "yes", then the program proceeds to the point 218. If the engine is operating without the closed loop air/fuel ratio control, then the program proceeds to the point 224 where the computer program is returned to the point 204.

At the point 218 in the program, a determination is made as to whether or not an A/FRC clamp flag is set. The A/FRC clamp flag is set, during the execution of an another program, to indicate that the correction factor ALPHA used in the closed loop air/fuel ratio control is clamped to its upper limit (1.25) or its lower limit (0.75) for a long period of time. This clamped condition occurs when the difference of the existing air/fuel ratio from the stoichiometric value is too great to perform effective closed loop air/fuel ratio control and it indicates the possibility of failure of the alcohol concentration sensor 84 or its associated components. If the answer to this question is "yes", then the program proceeds to the point 220. Otherwise, the program proceeds to the point 224 where the computer program is returned to the point 204.

At the point 220 in the program, a determination is made as to whether or not an ISC clamp flag is set. The ISC clamp flag is set, during the execution of another program, to indicate that the engine is operating without a closed loop idling speed control. If the answer to this question is "yes", then the program proceeds to the point 222 where the NF flag is set to indicate that the alcohol concentration sensor 84 or its associated components is subject to failure. If the engine is operating with the closed loop idling speed control, then it means this condition is not suitable for checking alcohol concentration sensor failure since the air/fuel ratio varies with variations of the engine speed around a target idling speed value and the program proceeds from the point 220 to the point 224 where the computer program is returned to the point 204.

Figure 3:
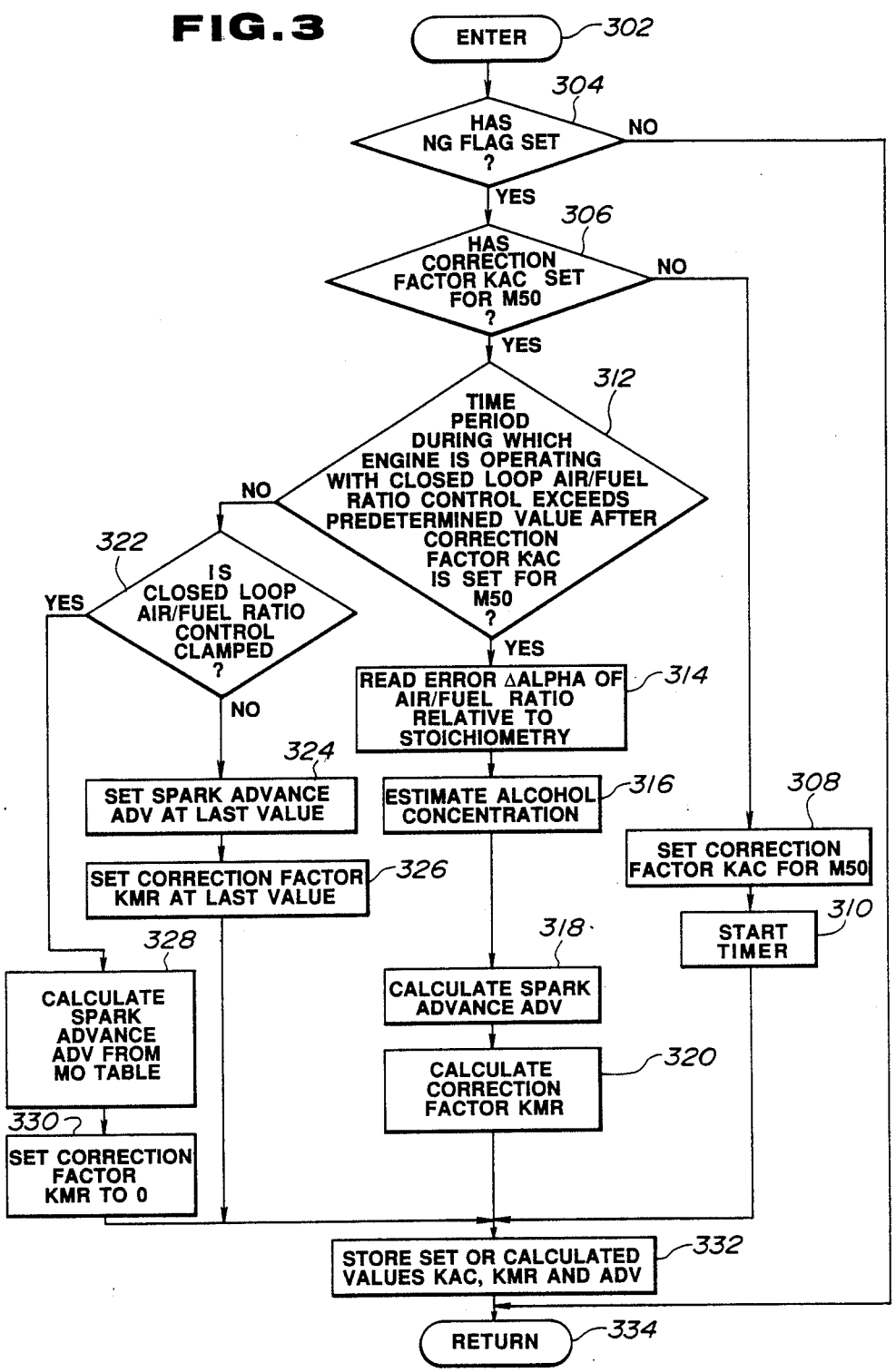
FIG. 3 is a flow diagram illustrating the programming of the digital computer as it is used to control the engine in the event of failure of the alcohol concentration sensor.

FIG. 3 is a flow diagram illustrating the programming of the digital computer as it is used in the event of failure of the alcohol concentration sensor 84. The computer program is entered at the point 302. At the point 304 in the program, a determination is made as to whether or not the NG flag (see FIG. 2) is set to indicate that the alcohol concentration sensor 84 is subject to failure. If the answer to this question is "no", then the program proceeds to the return point 334. If the NG flag is set, then the program proceeds to another determination step at the point 306. This determination is as to whether or not the correction factor KAC has been set at a value (1.547) suitable for M50. The character "M50" means a fuel contains 50 % alcohol concentration. It is intended through the invention that the number affixed to the letter "M" means the alcohol concentration contained in the fuel delivered to the fuel injector 40. This correction factor KAC=1.547 set for 50 % alcohol concentration will provide a richest possible mixture for the gasoline fuel (M0) containing 0% alcohol concentration and a leanest possible mixture for the gasoline/alcohol fuel blend (M85) containing 85% alcohol concentration. If the answer to this question is "yes", then the program proceeds to the point 312. Otherwise, the program proceeds to the point 308 where the correction factor KAC is set at the value (1.547) suitable for M50. Following this, the program proceeds to the point 310 where a timer is started and then to the point 332 where the set value (1.547) is stored in the computer memory for use in calculating the fuel delivery requirement.

At the point 312 in the program, a determination is made as to whether or not the period of time during which the engine is operating with a closed loop air/fuel ratio control exceeds a predetermined value after the correction factor KAC is set at a value (1.547) suitable for M50. This determination is made by reference to the timer. If the answer to this question is "yes", then it means that the closed loop air/fuel ratio control is effective and the program proceeds to the point 314 where the error $\Delta$ALPHA of the air/fuel ratio relative to stoichiometry is read from the computer memory. At the point 316 in the program, the central processing unit uses the air/fuel ratio error $\Delta$ALPHA to estimate the alcohol concentration from a linear interpolation between alcohol concentration related correction factors 1 and 1.547 at respective alcohol concentrations 0% (M0) and 50% (M50) or alcohol concentration related correction factors 1.547 and 1.93 at respective alcohol concentrations 50% (M50) and 85% (M85). Assuming now that the air/fuel ratio error $\Delta$ALPHA is $-10\%$, that is, the existing air/fuel ratio is 10% less than the stoichiometric value, the correction factor KAC has been set at a value (1.547) 10% less than a suitable value and the existing alcohol concentration can be estimated as $50\% \times \{1.547 \times (100\% - 10\%) - 1\}/(1.547 - 1) = 36\%$.

Assuming that the air/fuel ratio error $\Delta$ALPHA is $+10\%$, that is, the existing air/fuel ratio is 10% greater than the stoichiometric value, the correction factor KAC has been set as a value (1.547) 10% less than a suitable value and the existing alcohol concentration can be estimated as $50\% \times \{1.545 \times (100\% + 10\%) - 1\}/(1.547 - 1) = 64\%$.

At the point 318 in the program, the central processing unit uses the estimated alcohol concentration to select one or two of M0, M30, M60 and M85 tables included in the read only memory and it uses an interporation to calculate an appropriate value for the spark advance ADV from the selected spark advance tables. The M0 table, shown in FIG. 4, stores signals with values indicative of spark advance (degrees before top dead center) as functions of intake-manifold absolute-pressure (mmHg) and engine speed (RPM) for a gasoline fuel (M0) containing no alcohol. The M30 table, shown in FIG. 5, stores signals with values indicative of spark advance (degrees before top dead center) as functions of intake-manifold absolute-pressure (mmHg) and engine speed (RPM) for a gasoline/alcohol fuel blend (M30) containing 30% alcohol concentration. The M60 table, shown in FIG. 6, stores signals with values indicative of spark advance (degrees before top dead center) as functions of intake-manifold absolute-pressure (mmHg) and engine speed (RPM) for a gasoline/alcohol fuel blend (M60) containing 60% alcohol concentration. The M85 table, shown in FIG. 7, stores signals with values indicative of spark advance (degrees before top dead center) as functions of intake-manifold absolute-pressure (mmHg) and engine speed (RPM) for a gasoline/alcohol fuel blend (M85) containing 85% alcohol concentration.

At the point 320 in the program, the central processing unit uses the air/fuel ratio error $\Delta$ALPHA to calculate an appropriate value for the fuel enrichment related correction factor KMR based on the air/fuel ratio error ΔALPHA. Assuming now that the air/fuel ratio error ΔALPHA is −10%, that is, the existing air/fuel ratio is 10% less than the stoichiometric value, the correction factor KMR is set at a value 10% less than the value determined by the existing intake-manifold absolute-pressure PB. Assuming that the air/fuel ratio error ΔALPHA is +10%, that is, the existing air/fuel ratio is 10% greater than the stoichiometric value, the correction factor KMR is set at a value 10% greater than the value determined by the existing intake-manifold absolute-pressure PB.

At the point 332 in the program, the calculated values ADV and KMR are stored in the computer program for use in calculating appropriate values for fuel delivery requirement and ignition-system spark timing. Following this, the program proceeds to the return point 334.

If the time period during which the engine is operating with closed loop air/fuel ratio control is less than the predetermined value after the correction factor KAC is set at a value suitable for M50, then the program proceeds from the point 312 to another determination step at the point 322. This determination is as to whether or not the closed loop air/fuel ratio control is clamped, that is, whether the correction factor ALPHA is clamped to its upper limit (1.25) or its lower limit (0.75). If the answer to this question is "no", then the program proceeds to the point 324 where the spark advance ADV is set at the last value therefor and then to the point 326 where the correction factor KMR is set at the last value therefor. Following this, the program proceeds to the point 332.

If the correction factor ALPHA is claimped to its upper limit (1.25) or its lower limit (0.75), then the program proceeds from the point 322 to the point 328 where an appropriate value for spark advance ADV is calculated from the M0 table and to the point 330 where the correction factor KMR is set to zero so as to inhibit fuel enrichment during high engine load conditions. The reason for this is that a further enrichment will cause an overrich mixture to be supplied to the engine operating on gasoline fuel or a gasoline/alcohol fuel blend containing an alcohol concentration of 20% or less since the correction factor KAC is set at a value (1.547) that will provide a richest possible mixture for the gasoline fuel (M0), Following this, the program proceeds to the point 332 where the calculated values ADV and KMR are stored in the computer memory.

What is claimed is:

1. An apparatus for use with an internal combustion engine operable on either of gasoline fuel and gasoline-/alcohol fuel blend, comprising:
   an alcohol concentration sensor sensitive to an alcohol concentration of the fuel to be delivered to the engine for producing an alcohol concentration signal indicative of a sensed alcohol concentration;
   an oxygen sensor sensitive to an oxygen content of exhaust gases discharged from the engine for producing an air/fuel ratio feedback signal; and
   a control unit coupled to the alcohol concentration sensor and the oxygen sensor for controlling the amount of fuel metered to the engine and the timing of ignition at the engine, the control unit including means responsive to the air/fuel ratio feedback signal for calculating a difference of the air/fuel ratio from a stoichiometric value, first means for calculating a first value for the amount of fuel metered to the engine based on engine operating conditions, second means for calculating a second value for the ignition timing based on engine operating conditions for the sensed alcohol concentration, third means for correcting the calculated first value for the sensed alcohol concentration, fourth means for correcting the calculating first value to provide fuel enrichment during high engine load conditions, fifth means for correcting the calculated first value based on the calculated air/fuel ratio difference to provide a closed loop air/fuel ratio control, sixth means responsive to failure in the alcohol concentration sensor for producing a failure signal, and seventh means responsive to the failure signal for forcing the third means to correct the calculated first value for a predetermined alcohol concentration, the seventh means inhibiting the fourth means from providing fuel enrichment while forcing the second means to calculate the second value for the gasoline fuel when the closed loop air/fuel ratio control is clamped after the third means is forced to correct the calculated first value for the predetermined alcohol concentration, the seventh means forcing the fourth means to correct the calculated first value based on the calculated air/fuel ratio difference and the second means to calculate the second value based on the calculated air/fuel ratio difference when the closed loop air/fuel ratio control is in order after the third means is forced to correct the calculated first value for the predetermined alcohol concentration.

2. The apparatus as claimed in claim 1, wherein the sixth means includes means sensitive to an alcohol concentration signal change exceeding a predetermined degree for producing the failure signal.

3. The apparatus as claimed in claim 2, wherein the sixth means includes means for sampling a value of the alcohol concentration signal once in each of sampling events, means for calculating a difference between sampled new and last values, and means for producing the failure signal when the calculated difference is out of a predetermined range.

4. The apparatus as claimed in claim 1, wherein the sixth means includes means for producing the failure signal when the closed loop air/fuel ratio control is clamped.

5. The apparatus as claimed in claim 1, wherein the seventh means includes means for estimating the alcohol concentration based on the calculated air/fuel ratio difference when the closed loop air/fuel ratio control is in order after the third means is forced to correct the calculated first value for the predetermined alcohol concentration, means for forcing the fourth means to correct the calculated first value based on the calculated air/fuel ratio difference and the second means to calculate the second value for the estimated alcohol concentration.

6. The apparatus as claimed in claim 1, wherein the predetermined alcohol concentration is 50%.

* * * * *